United States Patent [19]

Simon et al.

[11] Patent Number: 5,587,831

[45] Date of Patent: Dec. 24, 1996

[54] SEMICONDUCTOR FOIL BEAM-SPLITTER FOR AN INFRARED SPECTROMETER

[75] Inventors: Arno Simon, Karlsruhe; Jürgen Gast, Rheinstetten, both of Germany

[73] Assignee: Bruker Analytische Messtechnik GmbH, Rheinstetten, Germany

[21] Appl. No.: 156,430

[22] Filed: Nov. 23, 1993

[30] Foreign Application Priority Data

Dec. 16, 1992 [DE] Germany ............... 42 42 440.2

[51] Int. Cl.$^6$ ............................................. G02B 1/10
[52] U.S. Cl. ................. 359/350; 359/629; 359/634; 356/345
[58] Field of Search ................................ 359/350, 629, 359/634; 356/345

[56] References Cited

U.S. PATENT DOCUMENTS

| 4,632,553 | 12/1986 | Vidrine et al. | 356/346 |
| 5,225,926 | 7/1993 | Cuomo et al. | 359/350 |
| 5,258,872 | 11/1993 | Johnson et al. | 359/589 |

FOREIGN PATENT DOCUMENTS 345475  5/1960  Switzerland.

OTHER PUBLICATIONS

Article "Self-Supporting Thin-Film Beam Splitter for Far-Infrared Interferometers" of G. Kampffmeyer, published Appl.Phys. 14, 313–317 (1977).
Prospects of Virginia Semiconductor Inc., Fredericksburg, Virginia USA dated 24th May 1988 and 22nd May 1990.
C & EN Special Report dated 15th May 1989, pp. 24 to 39.

Primary Examiner—Georgia Y. Epps
Assistant Examiner—Jacqueline M. Steady

[57] ABSTRACT

In a self-supporting beam-splitter (1), in particular for use in an FTIR-spectrometer for the far-infrared region, with an optical thickness on the order of the interesting wavelength region, the foil beam-splitter (1) consists of an undoped semi-conductor material or carbon which is transparent in the far-infrared, and is preferentially made from thin silicon sheets or diamond foil in the thickness region between 2 μm and 125 μm. In this fashion, an extremely high efficiency for the beam-splitter is achieved, whereby little or no resonant absorption takes place due to the beam-splitter in the interesting wavelength region.

6 Claims, 1 Drawing Sheet

SEMICONDUCTOR FOIL BEAM-SPLITTER FOR AN INFRARED SPECTROMETER

BACKGROUND OF THE INVENTION

The invention concerns a self-supporting foil beam-splitter in particular for use in a FTIR (Fourier transform infrared) spectrometer for the far infrared range with an optical thickness on the order of the interesting wavelength.

A self supporting foil beam-splitter of this type, is for example known from the article "Self-Supporting Thin-Film Beam-Splitter for Far-Infrared Interferometer" by G. Kamffmeyer in Zeitschrift Appl. Phys. 14, 313–317(1977).

Beam-splitters are needed in Fourier transform infrared (FTIR) spectroscopy which can split the beam in a ratio of 1:1 over as wide a spectral region as possible. In addition, the beam-splitter must exhibit interferometer grade precision. In the spectral range of ca. 2–25 μm (mid-infrared) beam-splitters are often utilized for this purpose which consist typically of a plane-parallel substrate plate, upon which a thin beam-splitting layer is evaporated, as well as a compensation plate made from the same material and having the same thickness as the substrate plate. The substrate and compensation plates are usually comprised from potassium bromide (KBr) whereas the beam splitting layer, in the simplest case, comprises evaporated germanium (Ge), and the layer thickness is so chosen, that the beam is split as close to the ratio 1:1 as possible, e.g. half is transmitted and half is reflected.

The regions of applicability of such a beam-splitter are limited by the spectral properties of the substrate material and the compensation plate as well as by the efficiency of the beam-splitting layer. Potassium bromide absorbs infrared radiation at wavelengths >25 μm (far infrared). The efficiency of the beam-splitting layer depends on its thickness and its index of refraction. In general the efficiency of a beam splitter is defined by the product of the reflection and transmission (R·T) which in the most advantageous case with a transmission ratio of 50:50, can assume a value of at most ¼. In actual cases, however, reflections from every surface are subject to further losses of approximately 4% due to absorption and scattering on the substrate and compensation plates for every beam passage, so that with seven such passages an actual total efficiency of at most $(0.96)^7$ RT is achieved.

Due to the large absorption of potassium bromide in the far infrared region metal grids or thin plastic films have been normally utilized as beam-splitters for radiation with wavelengths λ>25 μm. The efficiency of the metal grids depends on their geometry, in particular on their corresponding grid constant. The metal grids can, in addition, only be usefully utilized for wavelengths which are larger than twice the grid separation.

The plastic films, as described in the above cited article, can be obtained with thicknesses d≧6 μm, have however a relatively low index of reflection of n≈1.7. Furthermore, the utilized plastics (polyethylene, polyethylene-terephthalate, polycarbonate, polyvinylchloride, polypropylene and the like) exhibit a high absorption in the infrared region and, in particular, also have strong resonance absorption bands which lead to strong prominent structures, caused by the foil beam-splitter used, in the obtained spectra. Due to the low index of the fraction and the strong absorption, the efficiency of these plastic foil beam-splitters is relatively low and these beam-splitters can only be utilized over a small spectral range.

It is therefore the purpose of this invention to present a self-supporting foil beam-splitter for the far infrared region of the above mentioned kind which exhibits a substantially higher efficiency than known plastic foil beam-splitters and has, if possible, no resonance absorption bands in the interesting wave length region of λ>25 μm.

SUMMARY OF THE INVENTION

This purpose is achieved in accordance with the invention in that the foil beam-splitter comprises undoped semiconductor material and/or carbon which is transparent in the far infrared. The named materials exhibit a substantially higher index of refraction than the plastics from which the known plastic foil beam-splitters are produced and absorb very little if at all in the desired spectral region (far-infrared). Thereby, the inventive foil beam-splitters have a higher efficiency, and do not superimpose undesired structures resulting from possible resonance absorption bands in the far-infrared range upon the spectra taken with their assistance.

In a particularly preferred embodiment, the inventive foil beam-splitter contains a thin foil-like silicon or germanium sheet. In particular, silicon sheets are commercially available at reasonable prices in the desired thickness range (see for example the company brochure, Virginia Semiconductor Inc., Fredericksburg, Va., USA of 24th May 1988 and from 22nd May 1990). Although beam-splitters from silicon are known per se from U.S. Pat. No. 4,632,553, the beam-splitters described therein are, however, wedge-shaped silicon plates of 0.5 to 2 mm in thickness. In view of their thicknesses which are, relative to the inventive self-supporting foil beam-splitters larger by 2 to 3 orders of magnitude and to the reflection losses on the surface and the strong absorption which results therefrom, the known beam-splitters exhibit an extremely low efficiency which in fact is less than the efficiency of the known plastic foil beams-splitters. Furthermore the optical path through the relatively thick, wedge-shaped silicon plates in accordance with the U.S. Pat. No. 4,632,553 is by no means comparable to that through a thin foil with an optical thickness on the order of the interesting wavelength region.

In a further embodiment the self-supporting foil beam splitter in accordance with the invention can contain a thin foil-like diamond sheet. This type of diamond foil is known in particular from C & EN Special Report of May 15th, 1989, pages 24 through 39 available from the American Chemical Society in Washington D.C. USA. Since diamond exhibits an index of refraction of n=2.4 and is largely transparent for far-infrared light, this type of foil beam-splitter exhibits a substantially higher efficiency than the known plastic foil beam-splitters.

For silicon as well as for diamond foils the production tolerances for the flatness of the surface of the commercially available foils are sufficient for optical use as a foil beam-splitter. Thereby one should take note of the fact that both the mentioned silicon foil as well as the diamond foil have been developed within a completely different technical context and, up to this point, have never been used for optical applications in the far-infrared region. Diamond was, up to this point, never utilized as a beam splitter material and also the utilization of semi-conductor materials in general in the far-infrared in the form of a self-supporting foil beam-splitter of reduced thickness is also absolutely new.

The self-supporting foil beam-splitter according to the invention preferentially exhibits a thickness d between 2 μm and 125 μm. It can, as can the known plastic foil beamsplitter, be produced in thickness steps of d=125 µm, 50 µm, 25 µm, 12 µm and 6 µm and for special applications also with thickness steps of 4 µm, 3 µm and 2 µm whereby the above mentioned commercially available silicon or diamond sheets can be utilized.

In the case of the silicon or germanium foil beam-splitters, a thickness of d≈10 µm is preferred and in the case of diamond beam-splitters a thickness of d≈15 µm. These special thicknesses cover the interesting region for measurements in the far-infrared.

The invention is described and explained in greater detail below with the embodiments represented in the drawings. The features which can be derived from the description and drawings can be used individually in other embodiments or collectively in arbitrary combination.

BRIEF DESCRIPTION OF THE DRAWING

FIG. 2 b) shows the theoretical dependence of the wave number $\lambda_{max}^{-1}$ at maximum efficiency on the thickness d of the beam-splitter utilized.

DESCRIPTION OF THE PREFERRED EMBODIMENT

Figure 1:
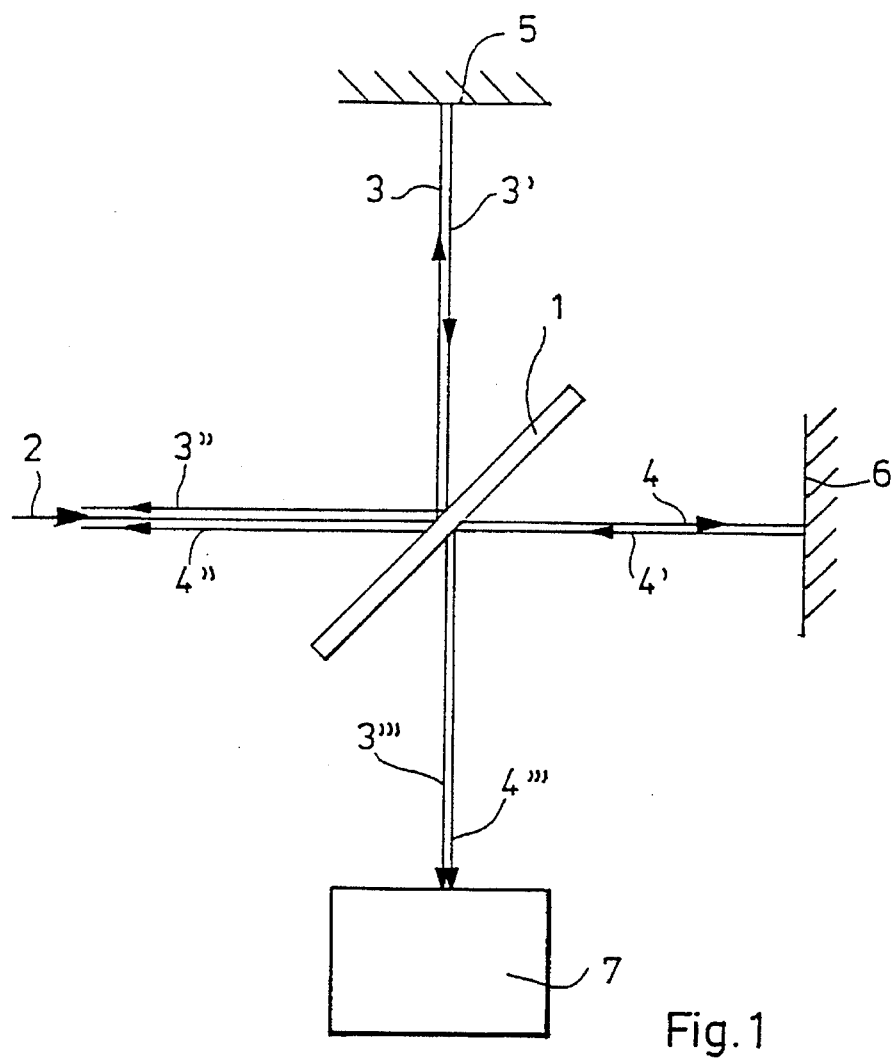
FIG. 1 shows a schematic optical path through a classical Michelson-interferometer.

In the typical Michelson-interferometer construction shown in FIG. 1, an incident beam 2 impinges at approximately 30° to 40° relative to the normal to the surface onto the self-supporting foil beam-splitter 1 in accordance with the invention. A portion of the incident beam, in an advantageous case 50%, is reflected from the surface of the foil beam-splitter 1 along the light path 3, and impinges on a mirror 5 from which it is reflected back along the light path 3' onto the beam-splitter 1. The beam-splitter splits the light beam travelling along the optical path 3' into a reflected partial beam, which leaves the interferometer in a direction along the path section 3" as well as a transmitted partial beam travelling along the optical path 3'" which impinges onto a detector 7. The portion of the light beam on the optical path 2 which is transmitted by the foil beam-splitter 1 is deflected onto the optical path 4 to mirror 6 and from there back along the optical path 4' onto the beam-splitter 1. Here the beam is split into two partial beams, namely the transmitted partial beam along the optical path 4" leaving the interferometer and that along the optical path 4'" which is reflected from the foil beam splitter 1 and deflected onto detector 7.

In a theoretically advantageous case, without absorption and scattering losses and with a 50:50 beam splitting, the sum of the light intensities along the path sections 3" and 4" and the path sections 3'" and 4'" would each be 50% of the intensity of the light beam incident along the optical path 2. In general, the efficiency of such a beam-splitter is defined by the product of the reflection R and the transmission T, whereby the reflection R=(n−1):(n+1) depends solely on the index of refraction n and on the beam-splitter material. The theoretically maximum achievable efficiency is thereby $(R \cdot T)_{theo} \leq \frac{1}{4} = 0.25$.

In actual applications with known beam-splitters such as those described above made from two potassium bromide plates with an evaported Ge-layer between, with every passage through one of the potassium bromide plates, approximately 4% of light intensity per partial bundle per surface is lost due to reflection. Although the evaporated germanium layer with a typical thickness between 0.2 and 0.5 µm does not significantly contribute to the absorption, nevertheless in this manner the actual efficiency is at best $(R \cdot T)_{real} \leq \frac{1}{4} \cdot (0.96)^7 \approx \frac{3}{16} \approx 0.19$ in the near and infrared region. On the other hand in the far-infrared region the absorption of the potassium bromide plates is sufficiently high that these known beam splitters cannot be utilized in the far-infrared region.

Instead, plastic foil beam-splitters have been utilized up to this time in the region λ>25 µm, whose thickness lies in the range of d≥6 µm and whose index of refraction n≈1.7. Due to the relatively low index of refraction, the reflection R and thereby the efficiency R·T of these plastic foil beam splitters is, however, very low. In addition they exhibit undesirable resonance absorption bands precisely in the far-infrared region which enormously distort the obtained spectra.

In contrast thereto, with the foil beam-splitter 1 in accordance with the invention, thin foil-like sheets of undoped semi-conductor material (and/or carbon) which is transparent in the far-infrared are utilized. The foil beam-splitter 1 in accordance with the invention can be composed of, for example, silicon foils or diamond foils which are easily available commercially with thicknesses d between 2 µm and 125 µm. The utilization of thin germanium foils is also possible.

Figures 2A, 2B:
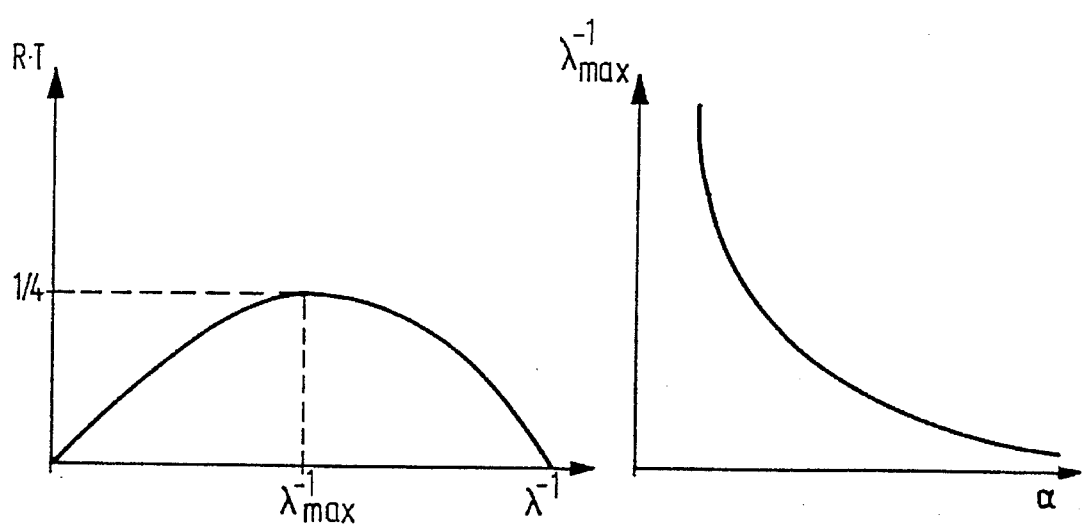
FIG. 2 a) shows a diagram of the theoretical efficiency dependence (R·T) as a function of wave number.

The relationship between the efficiency R·T and the wave number $\lambda_{-1}$ is shown in FIG. 2 a). At a particular wave length λ of the light utilized in the spectrometer, which corresponds to a wave number $\lambda_{max}^{-1}$, the theoretically possible maximum $(R \cdot T)_{theo} = \frac{1}{4}$ is achieved. FIG. 2 b) shows this wave number $\lambda_{max}^{-1}$ as a function of the thickness d of the foil beam splitter 1.

For a 50% splitting, the foil thicknesses for silicon and germanium foil beam-splitters, due to their corresponding indices of refraction ($n_{Si}$ =3.5; $n_{Ge}$ ≈4) are d≈10 µm. With a diamond beam splitter ($n_{Diamond}$ =2.4) a foil thickness d≈15 µm is advantageous for a 1:1 foil beam splitter.

We claim:

1. An infrared spectrometer comprising:
   an incident beam having a wavelength in a far infrared optical region; and
   a beamsplitter, the beamsplitter consisting essentially of a self-supporting foil material selected from the group consisting of carbon and an undoped semi-conductor, the foil material having a thickness less than the wavelength of the incident beam.

2. The infrared spectrometer of claim 1, wherein the foil consists essentially of one of silicon and germanium.

3. The infrared spectrometer of claim 1, wherein the foil consists essentially of diamond.

4. The infrared spectrometer of claim 1, wherein the foil exhibits a thickness d between 2 µm and 125 µm.

5. The infrared spectrometer of claim 2, wherein the foil beam-splitter exhibits a thickness d of approximately 10 µm.

6. The infrared spectrometer of claim 3, wherein the foil beam-splitter exhibits a thickness d of approximately 15 µm.

* * * * *